United States Patent
Svensson et al.

(10) Patent No.: US 10,738,662 B2
(45) Date of Patent: *Aug. 11, 2020

(54) VALVE ARRANGEMENT AND VALVE GUIDE

(71) Applicant: VOLVO TRUCK CORPORATION, Göteborg (SE)

(72) Inventors: Stig Arne Svensson, Torslanda (SE); Lennart Langervik, Onsala (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,817

(22) Filed: Sep. 19, 2019

(65) Prior Publication Data

US 2020/0011213 A1    Jan. 9, 2020

Related U.S. Application Data

(63) Continuation of application No. 15/755,332, filed as application No. PCT/EP2015/078857 on Dec. 7, 2015, now Pat. No. 10,563,546.

(30) Foreign Application Priority Data

Sep. 9, 2015 (WO) ................. PCT/EP2015/070560

(51) Int. Cl.
| | |
|---|---|
| *F01L 3/00* | (2006.01) |
| *F01L 1/28* | (2006.01) |
| *F01L 3/08* | (2006.01) |
| *F02M 23/00* | (2006.01) |
| *F01L 3/06* | (2006.01) |

(52) U.S. Cl.
CPC ................. *F01L 1/28* (2013.01); *F01L 3/06* (2013.01); *F01L 3/08* (2013.01); *F02M 23/006* (2013.01); *Y02T 10/146* (2013.01)

(58) Field of Classification Search
CPC ................... F01L 3/20; F02M 23/006
USPC ..................... 123/26, 189, 188.9
See application file for complete search history.

(56) References Cited

U.S. PATENT DOCUMENTS

| | | | |
|---|---|---|---|
| 1,712,539 | A | 5/1929 | Willgoos |
| 1,799,397 | A | 4/1931 | Taylor et al. |
| 3,382,850 | A | 5/1968 | Baudry |

(Continued)

FOREIGN PATENT DOCUMENTS

| | | |
|---|---|---|
| CN | 2034994 U | 3/1989 |
| CN | 1187578 A | 7/1998 |

(Continued)

OTHER PUBLICATIONS

Chinese Office Action in corresponding Chinese Application No. 201580082972.2 dated Oct. 30, 2019 (7 pages).

(Continued)

*Primary Examiner* — Long T Tran
*Assistant Examiner* — James J Kim
(74) *Attorney, Agent, or Firm* — Venable LLP; Jeffri A. Kaminski

(57) ABSTRACT

A valve arrangement for supplying air to an internal combustion engine includes a first valve and a second valve arranged within the first valve. A valve guide for use in a valve arrangement is also provided.

11 Claims, 8 Drawing Sheets

(56) References Cited

U.S. PATENT DOCUMENTS

| | | | | |
|---|---|---|---|---|
| 3,987,769 | A | * | 10/1976 | Yew .................... F02B 19/1033 |
| | | | | 123/286 |
| 3,998,199 | A | | 12/1976 | Melchior |
| 4,058,091 | A | * | 11/1977 | Tanahashi ............. F02B 17/005 |
| | | | | 123/261 |
| 4,106,439 | A | | 8/1978 | Kanao |
| 5,009,251 | A | | 4/1991 | Pike et al. |
| 5,617,835 | A | | 4/1997 | Awarzamani et al. |
| 6,138,616 | A | * | 10/2000 | Svensson ................ F02B 21/00 |
| | | | | 123/26 |
| 10,563,546 | B2 | * | 2/2020 | Svensson .................. F01L 1/28 |
| 2004/0107936 | A1 | | 6/2004 | Leimer |

FOREIGN PATENT DOCUMENTS

| | | |
|---|---|---|
| CN | 1388853 A | 1/2003 |
| CN | 202187806 U | 4/2012 |
| CN | 104454135 A | 3/2015 |
| DE | 2532240 A1 | 1/1976 |
| DE | 202013104302 U1 | 10/2013 |
| FR | 1123180 A | 2/1953 |
| FR | 1021812 A | 9/1956 |
| FR | 1401216 A | 6/1965 |
| FR | 2089976 A5 | 1/1972 |
| GB | 239067 A | 9/1925 |
| GB | 1132840 A | 11/1968 |
| JP | S59158363 A | 9/1984 |
| NL | 84317 C | 9/1956 |
| WO | 2006123818 A1 | 11/2006 |

OTHER PUBLICATIONS

International Search Report (dated May 25, 2016) for corresponding International App. PCT/EP2015/078857 [Cited in Parent].

* cited by examiner

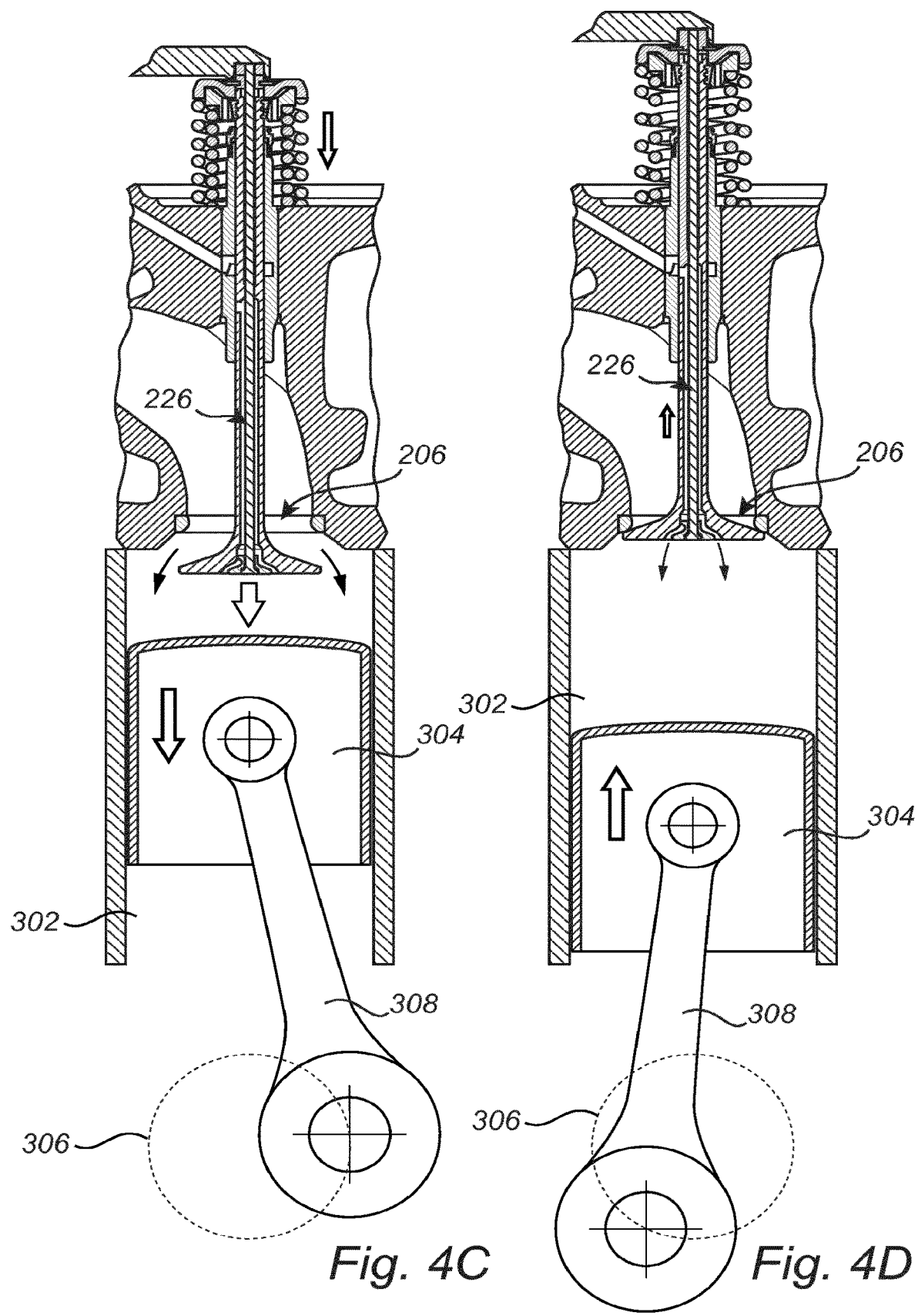

VALVE ARRANGEMENT AND VALVE GUIDE

CROSS REFERENCE TO RELATED APPLICATIONS

This application is a Continuation of U.S. patent application Ser. No. 15/755,332, filed Feb. 26, 2018, which is a 371 application of International Application No. PCT/EP2015/078857, filed Dec. 7, 2015, which claims priority to International Application No. PCT/EP2015/070560, filed Sep. 9, 2015.

BACKGROUND AND SUMMARY

The invention relates to a valve arrangement for supplying air to an internal combustion engine. The invention further relates to a valve guide for such a valve arrangement.

In connection with combustion engines, turbo chargers are often utilized which comprise a turbine which is driven by the flow of exhaust gases. The energy which is thus absorbed by the turbine is then transferred via a shaft to a compressor which is arranged to compress the air on the intake side of the combustion engine and thus increase the amount of air in the combustion chamber. This means that a larger amount of fuel can be fed to a combustion chamber in an engine, thus increasing the torque and power of the engine.

In turbocharged diesel engines intended for, for example, commercial vehicles the available torque from the engine during take-off is often somewhat inadequate. The reason for this is that an engine equipped with a turbocharger performs worse than a normally aspirated engine at low rpm's due to that the turbo charger is a hindrance of the aspiration. The fact that the engine has a take-off performance which is worse than a normally aspirated engine means that the amount of air which is typical for a turbocharged diesel engine is not supplied. This in turn means that the amount of fuel which is injected in the engine must be limited at low rpm's, in order to minimize the amount of smoke from incomplete combustion due to lack of air. The turbo charger will with increased exhaust energy supply an additional amount of air which will permit an increased amount of fuel and by that increased engine torque and engine power.

The above-mentioned sequence of events is furthermore unfavorable since it contributes to reduced performance during the take-off phase of the engine. The engine will furthermore be perceived by users as "insufficient" during the take-off phase, since it has been necessary to limit the amount of fuel supplied during the initial "aspirating engine" phase, also known as turbo-lag.

One way of eliminating the above mentioned turbo lag, is to feed extra additional air and by that additional fuel, to the engine during this take-off phase or other load cases where engine response is required, in order to increase the engine response and by that increase the exhaust energy the turbo turbine which create the possibility of feeding extra air and fuel to the engine For example, U.S. Pat. No. 6,138,616 discloses a valve arrangement in a combustion engine which is preferably equipped with a turbo unit, where the turbo function can be initiated earlier than in previously known devices and which adds to the starting torque of the engine. In particular, the valve arrangement comprises a secondary valve to supply additional air to the cylinder after the ordinary air supply from a main valve.

However, even though the disclosed apparatus provides a great improvement over prior art engines, there is still further room for improvement of the apparatus described in U.S. Pat. No. 6,138,616. The valve arrangement comprises a valve guide with a two piece design including an upper valve guide portion and a lower valve guide portion. A cavity is defined between the upper valve guide portion and the lower valve guide portion. This cavity is pressurized with compressed air when additional air is supplied via the secondary valve. This two-piece design of the valve guide require assembly with two different assembly tools in two separate operations followed by a reaming operation to secure a coaxial relationship between a centre axis of the upper valve guide portion and a centre axis of the lower valve guide portion.

It is desirable to provide a valve arrangement creating conditions for a more efficient assembly of the valve arrangement.

According to an aspect of the invention, a valve arrangement is provided for supplying air to an internal combustion engine, the valve arrangement comprising: a first valve for controlling an air supply to a cylinder, the first valve being movable between a closed position in which the air cannot be supplied to the cylinder and an open position in which the air is supplied to the cylinder, the first valve comprising: a first valve head, and a first valve stem comprising an inlet in a side wall of the valve stem, wherein the inlet is configured to receive additional air from a feeder channel, the first valve stem further comprising an internal passage, arranged in the length direction of the valve stem and fluidly connected to the inlet and configured to supply the additional air to the cylinder; a second valve arranged within the first valve and configured to control the flow of additional air to the cylinder, the second valve comprising a second valve stem and a second valve head contacting an inner surface of the first valve head when the second valve is in a closed position; a tubular valve guide arranged to surround a portion of the first valve stem such that the first valve stem is movable in the valve guide; characterized in that the valve guide comprises an inner groove forming a cavity between the valve guide and the first valve stem, wherein the valve guide further comprises a valve guide aperture configured to fluidly connect the inner groove to the feeder channel, and wherein the inlet of the first valve stem is aligned with the valve guide aperture when the first valve is in a closed position.

The definition that the valve guide is tubular should be interpreted to mean that the valve guide comprises an internal passage running along the length of the valve guide. Preferably, the internal passage has a substantially circular cross sectional shape. Moreover, the internal passage is adapted to match an outer dimension of the first valve stem such that the first valve stem is movable in the valve guide without there being any significant gap between the valve stem and the valve guide. Preferably, the first valve stem has a circular cross sectional shape defined by a diameter. The inlet of the first valve stem may also be referred to as a feeder hole, and the first valve stem may comprise one or more inlets, i.e. feeder holes. Moreover the first inlet valve may be regarded as the main or primary inlet valve, supplying the majority of air to the cylinder.

Designing the valve guide with the inner groove and the aperture forming a communication between a feeder channel in an engine head and the groove creates conditions for making the valve guide in a one-piece unit. This in turn creates conditions for a time-efficient assembly in that the valve guide may be positioned into its associated recess in the engine head via a single operation with a single assembly tool. Further, the valve guide design creates conditions for avoiding any additional machining after the positioning. Further, the valve guide design creates conditions for an accurate axial positioning of the groove relative to the feeder channel in the engine head on the outside and the inlet of the first valve stem on the inside. Further, such a one-piece valve guide design creates conditions for a cost-efficient production of the valve guide itself with proper tolerances.

According to one example, additional air is supplied to the cylinder from a compressed air tank when additional response is required from the engine, thus enabling an increased fuel amount to be supplied. This in turn generates a high increase in take-off performance, which eliminates the turbo-lag and the perception of the engine as being insufficient with regard to the take-off torque. In particular, turbo-lag may be overcome by means of the valve arrangement in a compensation system based on injection of pressurized air after main inlet valves are closing. The system comprises an electronic controller that controls the engine and the air injection system according to the following method steps: determining an engine operating condition including the boost pressure in the inlet manifold and in the extra accumulator air tank of compressed air in conjunction to the engine; determining if compressed air pressure is sufficient in the extra accumulator air pressure tank; determining an amount and/or duration of compressed air to be injected into the cylinder after the inlet valves are closed; determining a fuel amount adjustment based on the addition of pressurized air, desired air-fuel ratio, regulating/controlling the extra added air, after the inlet valves are closed, to a level near lambda 1 in air/fuel ratio and/or zero particulates is emitted in the engine out exhaust gases. It is determined to end the extra injection of air based on whether the turbo pressure is sufficient to take over the supply of requested air, or whether the torque demand of the driver has decreased.

According to an embodiment of the invention, the valve guide is made from a single piece. In particular, the valve guide can be machined from a single piece of material which is enabled by improved manufacturing methods. Thereby, the mechanical strength of the valve guide can be improved. Furthermore, the assembly process is simplified for a valve guide made from a single piece and no additional machining is required after the installation.

According to one embodiment of the invention, the inner groove is arranged to span the inner circumference of the valve guide. Thereby a cavity with a maximum volume is achieved for a given width of the groove, which in turn provides the largest possible addition of air to the cylinder via the one or more inlets in the first valve stem.

According to one embodiment of the invention, the inlet in first valve stem is arranged such that when the first valve is fully open, the inlet in the first valve stem is offset in relation to the valve guide aperture such that additional air is prevented from flowing from the feeder channel into the cylinder. Thus, when the first valve is fully open, no additional air can flow from the tank to the cylinder, and only the first valve, i.e. the main inlet, provides air to the cylinder. This minimizes the consumption of compressed air during an activation.

According to one embodiment of the invention, the second valve is configured such that the second valve head, when in an open position, does not protrude past an end face of the first valve head. Thereby, the valve arrangement can be used without having to adjust the valve recesses in the piston of the cylinder, since the second valve will not alter the outer geometry of the valve head of the first valve.

According to one embodiment of the invention, the valve arrangement further comprises a first spring connected to a first spring washer and a second spring connected to a second spring washer, wherein the first spring acts to close the first valve and the second spring acts to close the second valve. The first, outer, spring and washer are designed to provide the closing force to the internal second valve. The closing force thus contributes to the total closing force when the second valve is closed. The design means that the valve springs works independently when required and as an assembly when both valves are open.

According to one embodiment of the invention, a closing force of the second spring is higher than an air pressure force of additional air provided from said feeder channel. Thereby, additional air is prevented from flowing into the cylinder when the second valve is closed, even if the valve from the pressure tank is open so that additional pressurized air is provided to the valve arrangement.

According to one embodiment of the invention, the valve guide aperture is arranged so that a lower edge of the valve aperture does not reach below a lower edge of the groove. The location and diameter of the valve guide aperture is so located so that it does not affect the lower edge in the groove, which is important to achieve the correct timing of when the compressed air starts to be injected. The relative location of the lower edge of the groove versus the location and the size of the inlet of the first valve defines the timing and consumption of the air in the air injection.

There is also provided a vehicle or a stationary engine comprising a valve arrangement according to any one of the preceding embodiments.

According to an embodiment of the invention, there is provided an air supply arrangement for a combustion engine, the air supply arrangement comprising: a valve arrangement; a camshaft comprising a cam lobe, wherein the cam lobe is configured to control the first and second concentric valves such that the second valve opens prior to the opening of the first valve, and such that the second valve closes after the first valve has closed.

According to an embodiment of the invention the air supply arrangement further comprises a pressurized air tank for providing additional air a feeder channel fluidly connecting the air tank to the valve guide aperture; and a valve controlling the flow of air from the tank.

It is also desirable to provide a valve guide creating conditions for a more efficient assembly of a valve arrangement comprising the valve guide.

According to an aspect of the invention, a valve guide is provided for surrounding a portion of a first valve stem such that said first valve stem is movable in said valve guide, wherein the valve guide is tubular, characterized in that said valve guide comprises a recess in an inner surface for forming a cavity between said valve guide and said first valve stem, and that said valve guide further comprises an aperture fluidly connecting said recess with an outer surface of said valve guide.

More specifically, the valve guide is adapted so that the first valve stem may be moveably arranged in its main extension direction in the valve guide.

Designing the valve guide with the inner groove and the aperture for forming a communication between a feeder channel in an engine head with the groove creates conditions for making the valve guide in a one-piece unit. This in turn creates conditions for a time-efficient assembly in that the valve guide may be positioned into its associated recess in the engine head via a single operation with a single assembly tool. Further, the valve guide design creates conditions for avoiding any additional machining after the positioning. Further, the valve guide design creates conditions for an accurate axial positioning of the groove relative to the feeder channel in the engine head on the outside and the inlet of the first valve stem on the inside. Further, such a one-piece valve guide design creates conditions for a cost-efficient production of the valve guide itself with proper tolerances.

According to one embodiment, said valve guide is a one-piece unit. This creates conditions for a time-efficient assembly in that the valve guide may be positioned into its associated recess in the engine head via a single operation with a single assembly tool.

According to another embodiment, said recess forms a groove with a main extension in a circumferential direction of said valve guide. The groove creates conditions for a space-efficient structure for covering a plurality of circumferentially spaced inlets provided in the valve stem. According to one example, said recess forms a groove with a main extension in a direction perpendicular to an axial direction of said valve guide. According to a further example, said groove forms a continuous annular structure.

According to another embodiment, the recess is formed by machining the inner surface from an interior of the tubular valve guide. This creates conditions for a time-efficient production of the valve guide.

According to another embodiment, the aperture is positioned relative to the recess so that a surface defining the recess in an axial direction of the valve guide is at the same distance or closer to a first end of the valve guide than surface defining said aperture at the connection between the aperture and the recess. Thus, the aperture does not affect a lower edge of the recess defined by the surface defining the recess in the axial direction of the valve guide, which is adapted for controlling the timing of supply of the additional air to an associated cylinder.

According to another embodiment, the aperture is a hole with a circular cross section. It creates conditions for a time- and cost-efficient production, such as via drilling. According to one example, the aperture is therefore formed by a drilled hole.

According to another embodiment, an axis of the aperture is perpendicular to an axial direction of the valve guide.

According to another embodiment, said valve guide comprises a guide means adapted for guiding the valve guide to a circumferential position inside of a housing in which the aperture coincides with a feeder channel. According to one example, said guide means is positioned at a lower portion of the valve guide for engagement with an external tool during assembly.

According to another embodiment, a first portion of the valve guide comprising the aperture has a first diameter, and a second portion of the valve guide located adjacent to the first end of the valve guide has a second diameter smaller than the first diameter, thereby forming a tapered transition region between the first portion and the second portion of the valve guide, and wherein the guide means is located within the tapered transition region. Thereby, the external tool can use the tapered region as an identifier for where to locate the guide means.

According to another embodiment, the valve guide comprises a guide means in the form of a notch in the above described tapered region. The notch has a circumferential position aligned with a circumferential position of the aperture. Thereby, the assembly tool can utilize the notch as a guide means during to ensure that the aperture is correctly aligned in a valve arrangement comprising the valve guide. In other words, since the not is aligned with the aperture, the notch can be used to make sure that the aperture of the valve guide is aligned with an outlet of the feeder channel providing additional air to the cylinder via the valve arrangement.

According to another embodiment, the valve guide further comprises an alignment mark located between the aperture and a second end of the valve guide, wherein the alignment mark is configured to be visible when the valve guide is assembled in a valve arrangement. By observing the alignment mark of the valve guide after the valve guide has been arranged in the valve arrangement, it can be determined if the valve guide is located in the correct position such that the aperture is aligned with the feeder channel.

According to another embodiment, the alignment mark comprises a notch having a circumferential position aligned with a circumferential position of the aperture. A notch can be observed by means of a visual inspection, where it can be verified that the notch of the valve guide is aligned with a corresponding alignment mark of the valve arrangement in which the vale guide is mounted. However, the alignment mark of the valve guide may also be formed as an etch mark, an inscribed mark, or any other type of visually identifiable marking on the valve guide.

The invention further relates to a valve arrangement for supplying air to an internal combustion engine, the valve arrangement comprising: a first valve for controlling an air supply to a cylinder, the first valve comprising: a first valve head and a first valve stem; a valve guide according to any one of the alternatives above arranged to surround a portion of the first valve stem such that the first valve stem is movable in the valve guide.

According to another embodiment, the first valve stem comprising an inlet in a side wall of said valve stem, wherein said inlet is configured to receive additional air from a feeder channel via the aperture and the recess of the valve guide.

According to a further development of the last-mentioned embodiment, said first valve stem further comprising an internal passage arranged in the length direction of said valve stem and fluidly connected to said inlet and configured to supply said additional air to said cylinder.

According to a further development of the last-mentioned embodiment, the valve arrangement comprises a second valve arranged within said first valve and configured to control the flow of additional air to said cylinder, said second valve comprising a second valve stem and a second valve head.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 4A-E schematically illustrate different stages of a cycle of a valve arrangement according to an embodiment of the invention;

DETAILED DESCRIPTION

Figure 1A:
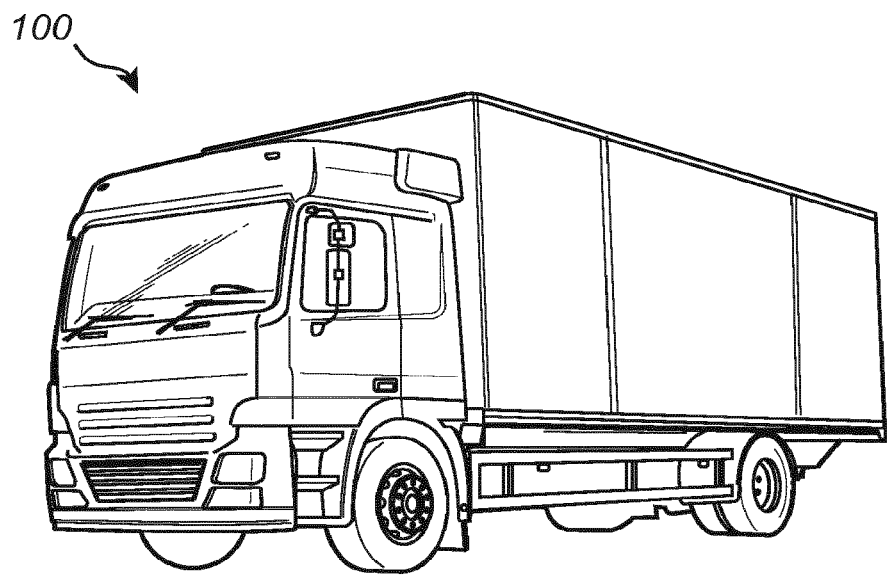
FIGS. 1A and 1B illustrate different types of vehicles equipped with a valve arrangement according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1B:
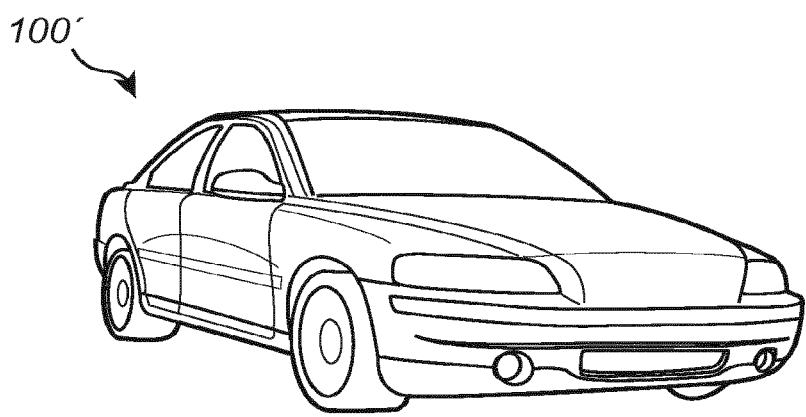
Figure 2:
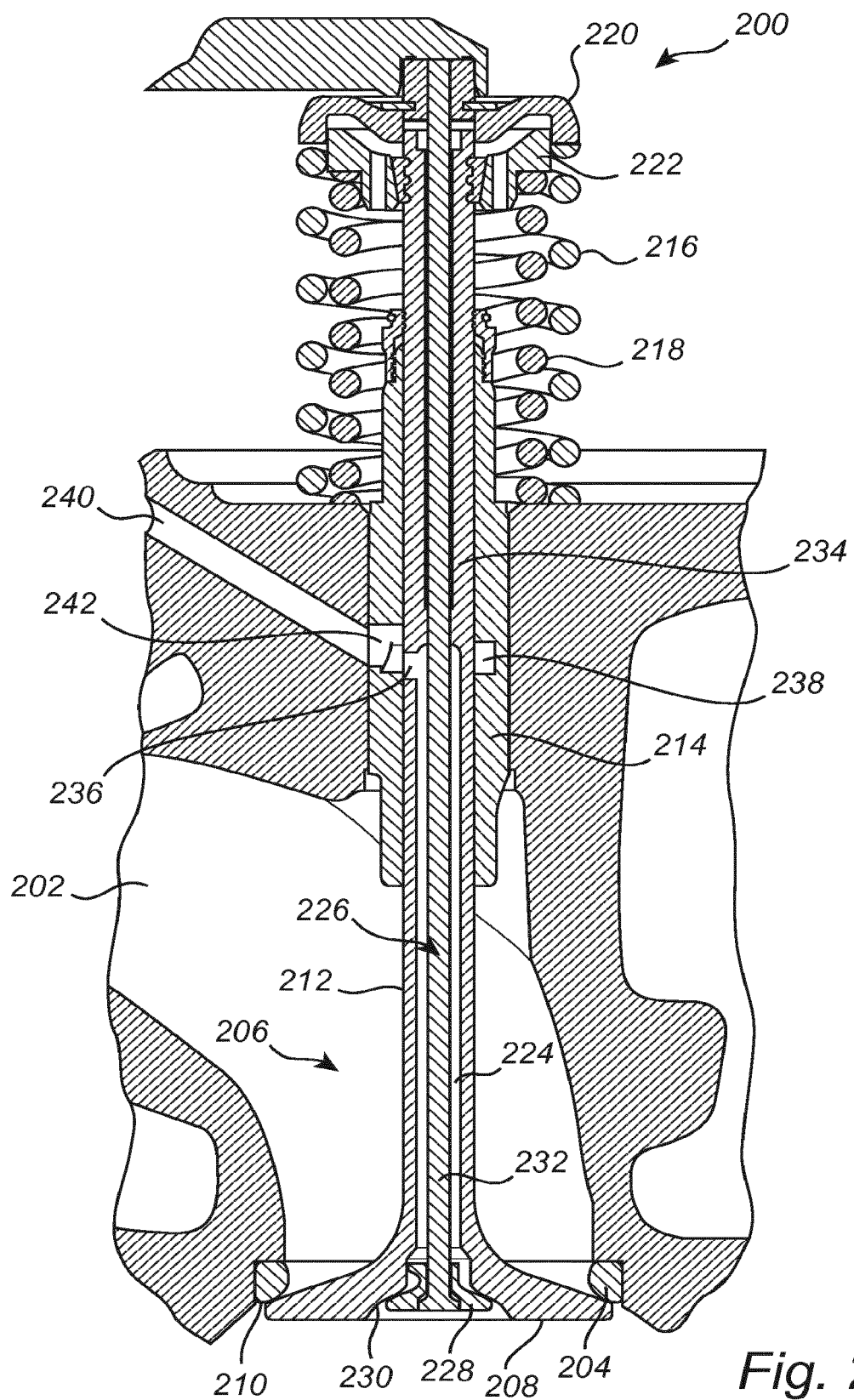
FIG. 2 schematically illustrates a valve arrangement according to an embodiment of the invention.

Referring now to the drawings and to FIGS. 1A, 1B, and 2 in particular, there is in FIG. 1A depicted an exemplary vehicle, here illustrated as a truck 100 comprising an engine in which a valve arrangement according to the present invention may be incorporated. The valve arrangement may of course be implemented also in a car 100', as shown in FIG. 1B, a working machine or in any engine, such a stationary engine, having a supply of compressed air.

The valve arrangement can be used in a combustion engine, such as a conventional turbocharged diesel engine. In particular, each cylinder of the engine may comprise a valve arrangement according to embodiments of the invention.

According to one exemplary method of operation, additional air is fed directly into the cylinders of an engine in connection with the take-off phase or when additional response from the engine is required, i.e. during the initial phase when it functions as an aspirating engine. This additional air is fed via a plurality of air passages, which lead up to the different cylinders. The feeding of ordinary and additional air to the different cylinders is done by means of at least one special valve arrangement which is provided at each of the different cylinders. Further details concerning such a valve arrangement and an engine comprising such a valve arrangement can be found in U.S. Pat. No. 6,138,616, hereby incorporated by reference.

Referring now to FIG. 2, the engine comprises a valve arrangement 200 arranged at an intake 202 of each cylinder of the engine. The intake 202 is used for feeding ordinary air to the cylinder. At the point where the intake 202 enters the cylinder, there is arranged a valve seat 204 against which a first valve 206 is arranged. To this end, the first valve 206 comprises a first valve head 208, which is in contact with a lower, essentially circular edge 210. The first valve head 208 is connected to a first valve-stem 212, which runs in an essentially jacket shaped valve guide 214. The function of the first valve 206 corresponds to the ordinary valve function of a diesel engine for the supply of ordinary air to the combustion in the different cylinders.

Using the force from an external valve spring 216 and an internal valve spring 218, the first valve head 208 is influenced to be in contact with the valve seat 204. To be more exact the first and second, external and internal, valve springs 216, 218 are in contact with, and press against, first and second, external and internal, spring washers 220, 222, respectively, where the second spring washer 222, via a valve lock, is in connection with the first valve-stem 212.

The lower part of the first valve stem 212 is essentially tube-shaped, and comprises an internal passage 224 extending in a longitudinal direction of the valve stem 212. The internal passage 224 is widened at its lower end. The internal passage 224 houses a second valve 226 with a second valve head 228 which is in contact with a further valve seat in the form of an inner surface 230 of the first valve head 208. The second valve head 228 is furthermore connected to a second valve stem 232 which has its extension inside the passage 224.

The upper part of the first valve stem 212 is shaped with a through-going passage-section 234, the inner dimensions of which essentially correspond to the outer dimensions of the second valve stem 232. The internal passage 224 in the lower part of the first valve stem 212 has a diameter which is larger than the diameter of the second valve stem 232 to allow a flow of additional air in said internal passage 224. There is furthermore arranged along the circumference of the first valve stem 212 at least one inlet 236, and especially a plurality of circumferentially spaced inlets. According to the example, three inlets are arranged equidistantly in the circumferential direction of the first valve stem 212.

Figure 3A:
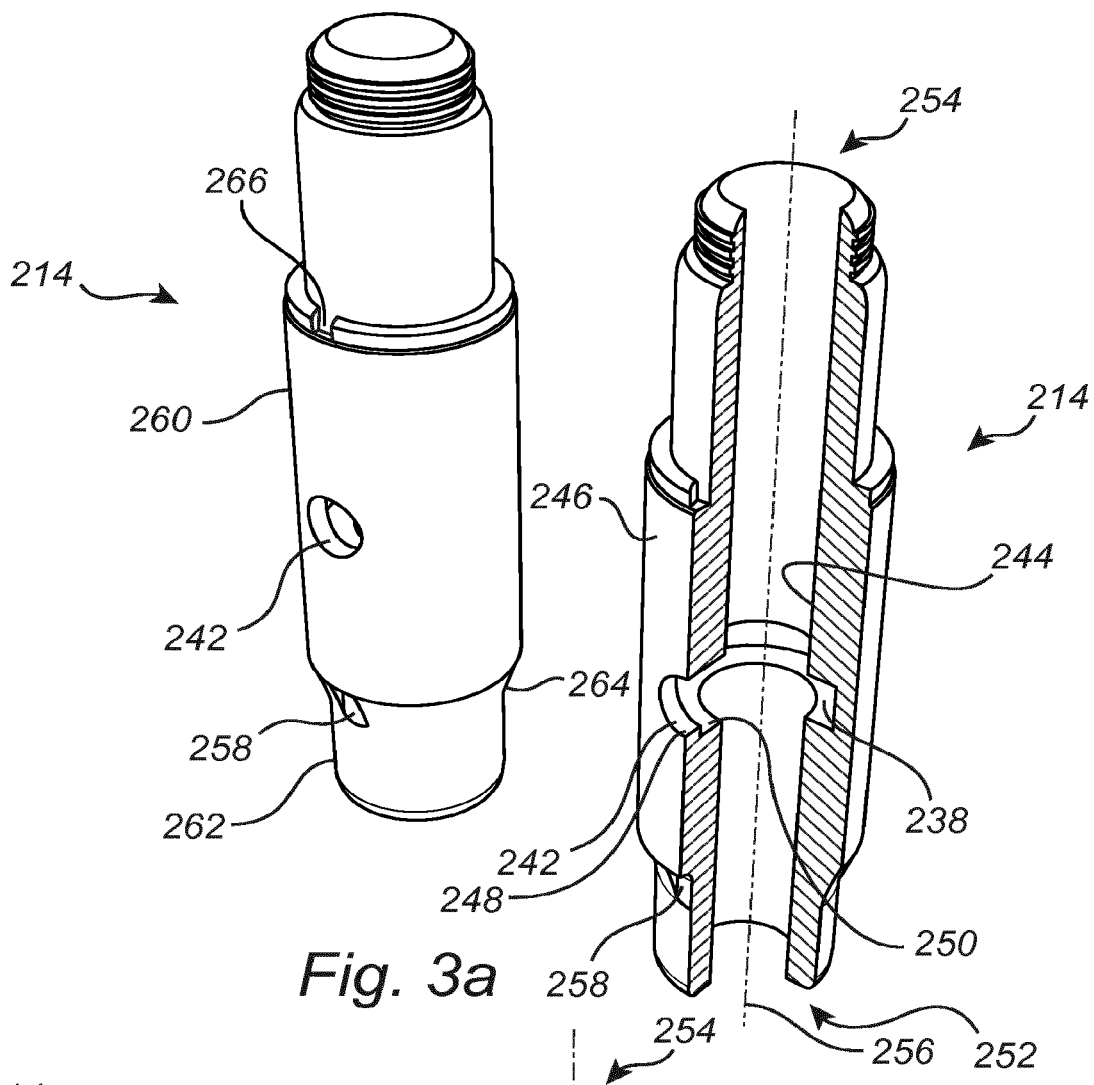
FIGS. 3A and 3B schematically illustrate a valve guide according to an embodiment of the invention.
Figure 3B:
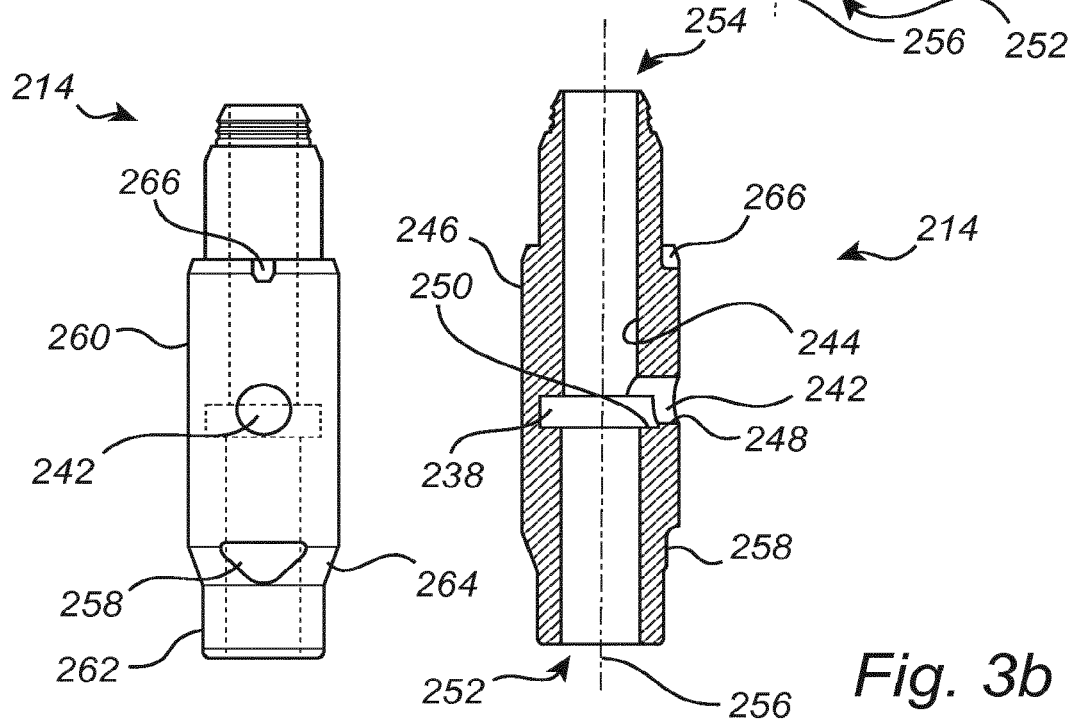

FIGS. 3A-B schematically illustrate the valve guide 214. The valve guide 214 is tubular. The valve guide 214 comprises a recess 238 in an inner surface 244 for forming a cavity between the valve guide 214 and the first valve stem 212. The valve guide 214 further comprises an aperture 242 fluidly connecting the recess 238 with an outer surface 246 of the valve guide 214. The valve guide 214 is a one-piece unit.

The recess 238 forms a groove with a main extension in a circumferential direction of the valve guide 214. More specifically, recess 238 forms a groove with a main extension in a direction perpendicular to an axial direction of the valve guide 214. More particularly, the groove 238 forms a continuous annular structure. In other words, the inner groove 238 can be seen to span the inner circumference of the valve guide. According to one example, the recess 238 is formed by machining the inner surface 244 from an interior of the tubular valve guide 214.

The valve guide aperture 242 is positioned relative to the recess 238 so that a surface 250 defining the recess in an axial direction 256 of the valve guide 214 is at the same distance or closer to a first end 252 of the valve guide 214 than a surface 248 defining the aperture 242 at the connection between the aperture 242 and the recess 238. In other words, the lower edge of the aperture 242 does not reach below the lower portion of the groove 238. Further, the aperture 242 is a hole with a circular cross section. More specifically, the aperture 242 is formed by a drilled hole. Preferably, an axis of the aperture 242 is perpendicular to an axial direction of the valve guide 214.

Further, the valve guide 214 comprises a guide means 258 adapted for guiding the valve guide to a circumferential position inside of a housing in which the aperture 242 coincides with a feeder channel 240. Especially, the guide means 248 is positioned at a lower portion of the valve guide 214 for engagement with an external tool during assembly.

Furthermore, a first portion 260 of the valve guide comprising the aperture 242 has a first diameter, and a second portion 262 of the valve guide located adjacent to the first end 252 of the valve guide has a second diameter smaller than the first diameter, thereby forming a tapered transition region 264 between the first portion 260 and the second portion 262. The guide means 258 is here embodied by a triangular notch 258 in the tapered region, wherein the notch 258 has a circumferential position which is aligned with a circumferential position of the aperture 242. The notch 258 has a flat surface in a direction parallel with the axial direction 256 of the valve guide 214, such that an engagement member of an assembly tool can be moved towards the surface of the notch 258 and recognize when the engagement member makes contact with the flat surface. Thereby, the assembly tool can verify that the valve guide is in the correct position before the pressing the valve guide into the cylinder head. The guide means 258 may also have the form of groove, a trench or the like allowing the engagement of an external tool during assembly of a valve arrangement.

The valve guide also comprises an alignment mark 266 located between the aperture 242 and a second end 254 of the valve guide, wherein the alignment mark is configured to be visible when the valve guide is assembled in a valve arrangement. The alignment mark 266 is here illustrated as a notch 266 having a circumferential position aligned with a circumferential position of the aperture 242.

A feeder channel 240 is connected to the cavity defined by the recess 238 via the valve guide aperture 242 arranged in the side wall of the valve guide 214. It is preferable that the resulting ellipsoid opening of the feeder channel 240, adjacent to the valve guide aperture 242, is completely covered by the valve guide aperture 242. Moreover, the groove 238 is aligned with the valve guide aperture 242 configured to connect the cavity formed by the groove 238 to the feeder channel 240.

In the normal position of the valve arrangement 200, i.e. when the first valve 206 is in contact with the valve seat 204 and the second valve 226 is in contact with the inside of the first valve head 208, the cavity formed between the groove 238 of the valve guide 214 and the first valve stem 212 is aligned with the at least one inlet 236 in the first valve stem 212. In order to connect additional air to the cylinder there is furthermore provided a drilled feeder channel 240 which terminates at the valve guide aperture 242 in the valve guide 214.

As will be described in detail below, air can be supplied to the feeder channel 240 via a control valve and further on to the lower internal passage 224 of the first valve stem 212. The additional air is thus led towards the engine cylinder via the second valve 226 which is continuously opened and closed by the camshaft, as will be described below. The second valve-stem 232 is at least along a certain section dimensioned so as to be a good fit against the lower end of the upper passage-section 234. This enables transfer of heat between the second valve-stem 232 and the first valve stem 212, at the same time as it provides a sealing function which prevents air from flowing upwards along the upper passage-section 234. It also protects the second valve-stem 232 from the risk of buckling, especially during high engine speed operation.

The function of the valve arrangement will now be described with reference to FIG. 2 and FIGS. 4A-E which schematically illustrate the different stages when supplying air to the different cylinders. FIGS. 4A-4E show the intake stroke in a cylinder 302 which is equipped with the valve arrangement 200 according to the invention. As is first shown in FIG. 4A, the piston 304 of the cylinder 302 is in its upper position in the cylinder 302. The piston 304 is, in a conventional manner connected to the crankshaft 306 via a connecting rod 308. In this upper position the first valve 206 is in contact with the valve seat 204 due to the spring-force from the spring 218. Furthermore, the second valve 226 is in contact with the inside 230 of the first valve head 208 due to the spring-force from the spring element 216.

Figures 4A, 4B:
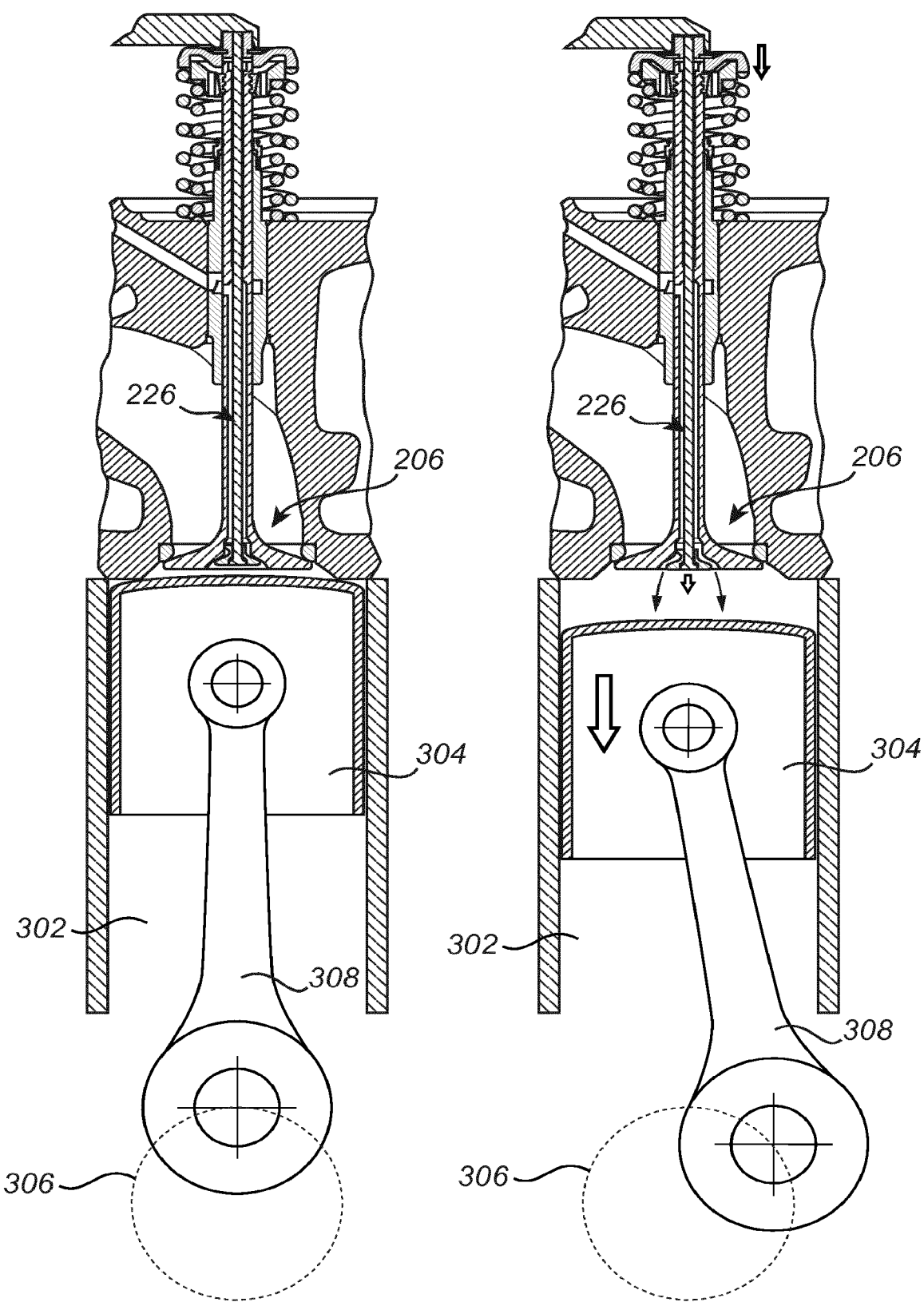

In the next phase, as shown in FIG. 4B, the piston 304 moves downwards. At the same time the valve arrangement 200 is influenced by the camshaft of the engine (not shown). Thus, the spring-force of the external spring 216 will first be exceeded, which leads to the second valve 226 being pressed a small distance downwards, whereby the second valve head 228 is lifted out of contact with the inside 230 of the first valve head 208. If the conditions for feeding additional air via the feeder channel 240 are fulfilled, and air has been fed to the internal passage 224, a marginal amount of additional air will now during a short time be fed to the cylinder 302, until the inlet is blocked by the lower part of the valve guide as a consequence of the opening of the first valve 206, i.e. the main inlet valve. Here, it can also be seen that the second valve head 228, when in an open position, does not protrude past an end face of the first valve head 208.

FIG. 4C shows the following phase in which the piston 304 is on its way down and the first valve 206 has been lifted out of the valve seat 204. At this phase, the ordinary air is aspirated into the cylinder 203 via the intake 202 in the cylinder head. Furthermore, the first valve-stem 212 has been displaced/opened a distance downwards relative the valve guide 214. This means that the at least one inlet 236 is no longer aligned with the groove 238 or the valve guide aperture 242, which causes the feeder channel 240 to be out of communication with the internal passage 224 of the first valve 206. This in turn means that no additional air is supplied during this phase, when the first valve 206 is open.

In the next phase, which is shown in FIG. 4D, the piston 304 has just passed its lowest position and is on its way upwards in the beginning of the compression stroke. Furthermore, the camshaft of the engine has influenced the valve arrangement 200 to be moved towards its initial position, so that the first valve 206 is now closed, i.e. the first valve head 208 is in contact with the valve seat 204. According to the invention, the camshaft is so arranged that the second valve head 228 has not yet come into contact with the first valve head 208, i.e. the second valve 226 is still open. Furthermore, the first valve-stem 212 in this phase is in such a position that the at least one inlet 236 is essentially aligned with the groove 238, which causes additional air to now be fed to the cylinder 302 via the passage defined by the internal passage 224. In this way, the first valve 206 will thus be closed and the second valve 226 will be open for the supply of additional air, which takes place during the beginning of the compression phase and after the first valve 206 is closed. The duration of this sequence of events (i.e. the supply of additional air) is controlled by the shape of the inlet lobe of the camshaft, as will be described in detail below in relation to FIG. 5A. The duration also depends on the positioning of the inlet 236 in relation to the groove 238.

Figure 4E:
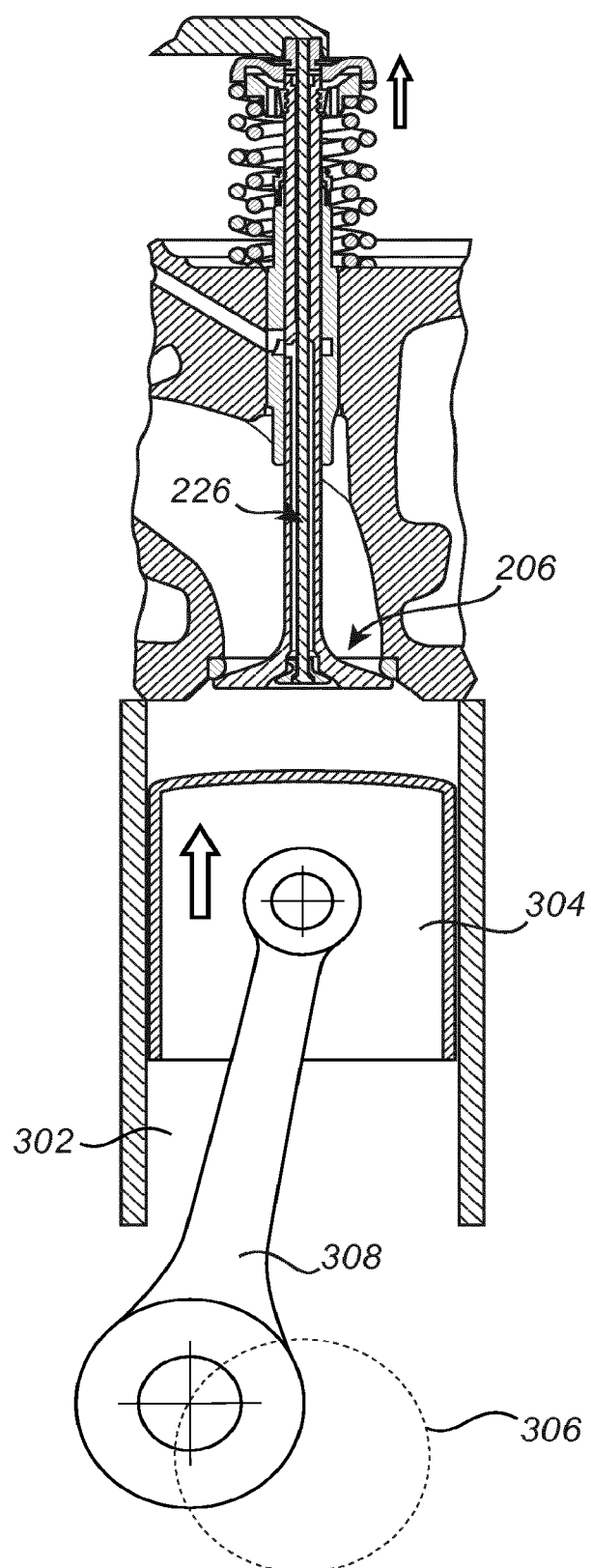

Finally, FIG. 4E shows that the second valve stem 232 and thus also the second valve head 228 has been released upwards, so that the second valve 226 is closed, i.e. the second valve head 228 is in sealing contact with the inside 230 of the first valve head 208. The spring element 216 is here so dimensioned that its spring-force, which attempts to close the second valve 226, exceeds the force with which the air pressure in the internal passage 224 affects the second valve 226. Subsequent to this final phase, the compression stroke is in a known manner started and a larger amount of fuel can be supplied, since a certain amount of additional air now has been fed into the cylinder 302.

Figure 5A:
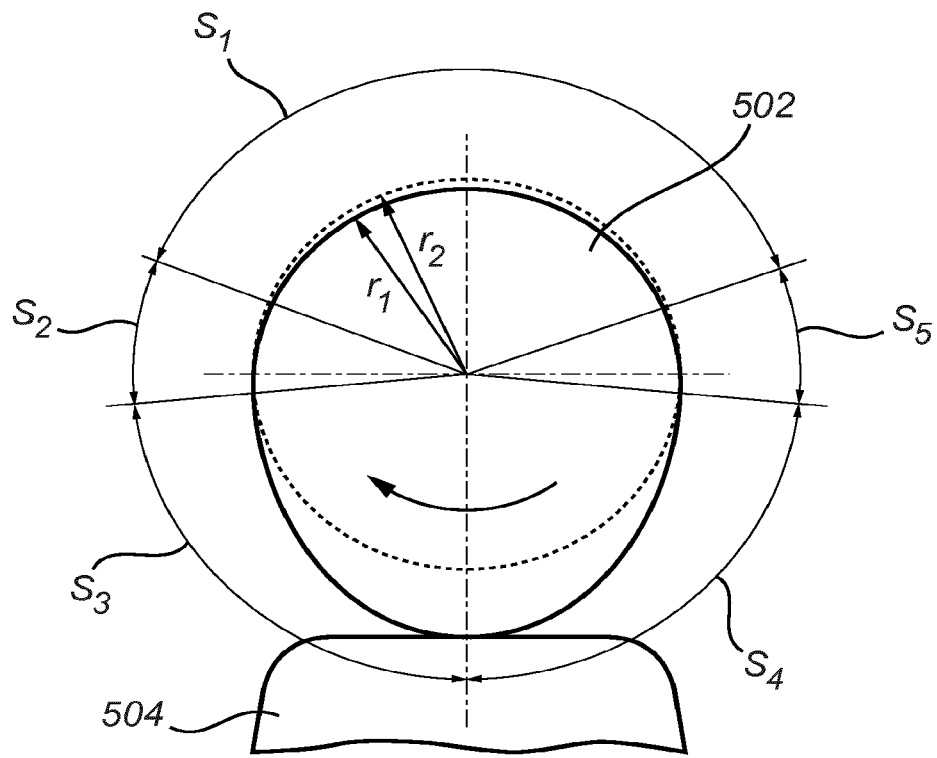
FIG. 5A schematically illustrates a cross section of a camshaft lobe which can be used in connection with an embodiment of the invention.

FIG. 5A shows a schematic cross-section of a camshaft 502 which can be used in connection with the invention. In a way which as such is known, and which is not shown in detail, the engine is used to drive the camshaft 502. The camshaft 502 affects a valve lifter 504, which in turn causes the valve arrangement 200 to open and close. FIG. 5A shows the radius $r_1$ of the camshaft 502 with a solid line, while the radius $r_2$ of a basic circle is indicated with a broken line. FIG. 5A also shows in principle five different angle-sectors $S_1$, $S_2$, $S_3$, $S_4$, $S_5$, which correspond to the different phases as shown in FIGS. 4A-E. Angle-sector $S_1$ thus corresponds to what is shown in FIG. 4a i.e. the valve arrangement 200 is closed, i.e. both the first valve 206 and the second valve 226 is closed. Angle-sector $S_2$ corresponds to what is shown in FIG. 4B i.e. the second valve 226 is open while the first valve 206 is closed. A marginal addition of air to the cylinder takes place during a short amount of time here when air is supplied. Furthermore, angle-sector $S_3$ corresponds to that shown in FIG. 4C, i.e. the first valve 206 is open but no additional air is supplied since the inlet 236 is not aligned with the groove 238. During angle-sector $S_4$ the first valve 206 starts to close. Finally, angle-sector $S_5$ corresponds to FIG. 4D, i.e. a position where the first valve 206 is closed but the second valve 226 is still kept open. This angle-sector $S_5$ in this manner forms a "plateau" with an essentially constant radius of the camshaft 502 with additional air being supplied to the different cylinders. By varying the size of this angle-sector us, the period of time during which additional air is supplied can be varied, thereby controlling the lift curve of the valve arrangement. The disclosed valve lift curve is a unique low cost feature for the valve arrangement according to embodiments of the invention to maneuver two functions with one modified lift curve for maximum synchronization and control of the motion between the two valves.

Figure 5B:
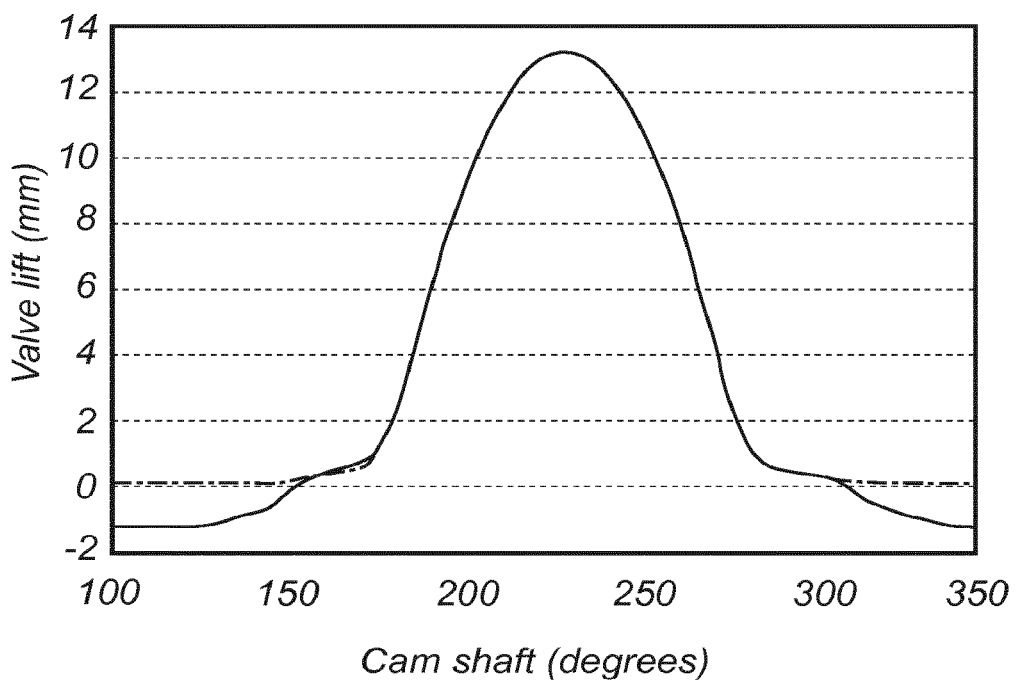
FIG. 5B schematically illustrates a resulting lift curve when using a valve arrangement according to an embodiment of the invention.
Figure 6:
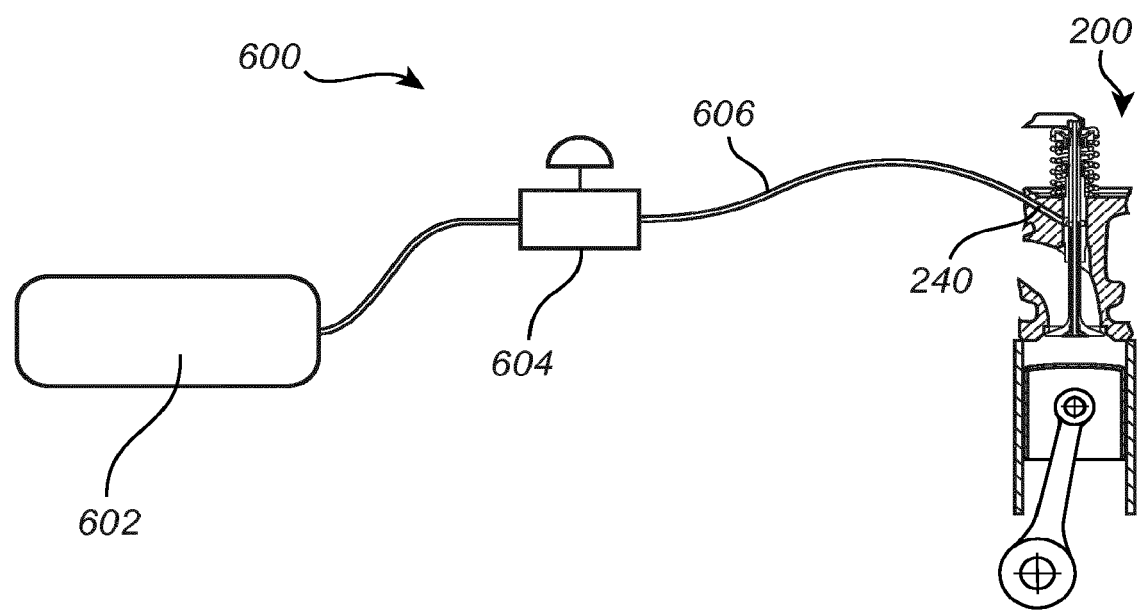
FIG. 6 schematically illustrates an air supply arrangement according to an embodiment of the invention.

FIG. 5B schematically illustrates a lift curve (solid) for the camshaft 502 described in FIG. 5A. The lift curve is compared to a lift curve (dashed) for a conventional camshaft. FIG. 6 schematically illustrates an air supply arrangement 600 comprising a pressurized air tank 602 for providing additional air to the cylinder. The flow of air from the pressurized air tank 602 to the feeder channel 240 is controlled by a valve 604 arranged on the air supply line 606. Thereby, the valve can be controlled so that additional air is only supplied to the cylinder during selected load cases when the addition of air is required.

It is to be understood that the present invention is not limited to the embodiments described above and illustrated in the drawings; rather, the skilled person will recognize that many changes and modifications may be made within the scope of the appended claims. The invention can for example be used in different kinds of combustion engines, e.g. diesel engines and gasoline engines. The invention is furthermore not limited to use in connection with turbocharged engines, but can also be used for supplying additional air in engines without turbo units.

The invention claimed is:

1. A valve arrangement for supplying air to an internal combustion engine, the valve arrangement comprising:
   a first valve for controlling an air supply to a cylinder, the first valve being movable between a closed position in which the air cannot be supplied to the cylinder and an open position in which the air is supplied to the cylinder, the first valve comprising: a first valve head, and a first valve stem comprising an inlet in a side wall of the first valve stem, wherein the inlet is configured to receive additional air from a feeder channel, the first valve stem further comprising an internal passage, arranged in the length direction of the valve stem and fluidly connected to the inlet and configured to supply the additional air to the cylinder;
   a second valve arranged within the first valve and configured to control the flow of additional air to the cylinder, the second valve comprising a second valve stem and a second valve head in contact with an inner surface of the first valve head when the second valve is in a closed position;
   a tubular valve guide arranged to surround a portion of the first valve stem such that the first valve stem is movable in the valve guide;
   wherein the valve guide comprises an inner groove forming a cavity between the valve guide and the first valve stem, wherein the valve guide further comprises a valve guide aperture configured to fluidly connect the inner groove to the feeder channel, and wherein the inlet of the first valve stem is aligned with the valve guide aperture when the first valve is in a closed position.

2. The valve arrangement according to claim 1, wherein the valve guide is made from a single piece.

3. The valve arrangement according to claim 1, wherein the inner groove is arranged to span the inner circumference of the valve guide.

4. The valve arrangement according to claim 1, wherein the inlet in the first valve stem is arranged such that when the first valve is fully open, the inlet in the first valve stem is offset in relation to the aperture of the valve guide such that additional air is prevented from flowing from the feeder channel into the cylinder.

5. The valve arrangement according to claim 1, wherein the second valve is configured such that the second valve head, when in an open position, does not protrude past an end face of the first valve head.

6. The valve arrangement according to claim 1, further comprising a first spring connected to a first spring washer and a second spring connected to a second spring washer, wherein the first spring acts to close the first valve and the second spring acts to close the second valve.

7. The valve arrangement according to claim 6, wherein a closing force of the second spring is higher than an air pressure force of additional air provided from the feeder channel.

8. The valve arrangement according to claim 1, wherein the valve aperture is configured so that a lower edge of the valve guide aperture does not reach below a lower edge of the groove.

9. A vehicle or a stationary engine comprising a valve arrangement according to claim 1.

10. An air supply arrangement for a combustion engine, the air supply arrangement comprising:
    a valve arrangement according to claim 1;
    a camshaft comprising a cam lobe, wherein the cam lobe is configured to control the first and second valves such that the second valve opens prior to the first valve, and such that the second valve closes after the first valve has closed.

11. The air supply arrangement according to claim 10, further comprising:
    a pressurized air tank for providing additional air;
    a feeder channel fluidly connecting the air tank to the valve guide aperture; and
    a valve controlling the flow of air from the tank.

* * * * *